(12) United States Patent
Zidan et al.

(10) Patent No.: US 7,384,574 B2
(45) Date of Patent: Jun. 10, 2008

(54) HYDROGEN STORAGE MATERIAL AND PROCESS USING GRAPHITE ADDITIVE WITH METAL-DOPED COMPLEX HYDRIDES

(75) Inventors: Ragaiy Zidan, Aiken, SC (US); James A. Ritter, Lexington, SC (US); Armin D. Ebner, Lexington, SC (US); Jun Wang, Columbia, SC (US); Charles E. Holland, Cayce, SC (US)

(73) Assignees: Westinghouse Savannah River Co., Aiken, SC (US); University of South Carolina, Columbia, SC (US)

( * ) Notice: Subject to any disclaimer, the term of this patent is extended or adjusted under 35 U.S.C. 154(b) by 933 days.

(21) Appl. No.: 10/894,301

(22) Filed: Jul. 19, 2004

(65) Prior Publication Data

US 2005/0032641 A1 Feb. 10, 2005

Related U.S. Application Data

(60) Provisional application No. 60/488,108, filed on Jul. 17, 2003.

(51) Int. Cl.
*C01B 6/24* (2006.01)
*C01B 6/10* (2006.01)
(52) U.S. Cl. ............ 252/182.35; 252/182.32; 423/644; 423/645; 423/658.2
(58) Field of Classification Search ........ 423/644, 423/645, 646, 647, 658.2; 252/182.35
See application file for complete search history.

(56) References Cited

U.S. PATENT DOCUMENTS

| | | | |
|---|---|---|---|
| 3,720,752 A | 3/1973 | Van Houten | |
| 4,360,569 A | 11/1982 | Steyert et al. | |
| 4,948,423 A | 8/1990 | Fetcenko et al. | |
| 5,500,309 A | 3/1996 | Lichtenberg et al. | |
| 6,268,077 B1 | 7/2001 | Kelley et al. | |
| 6,342,198 B1 | 1/2002 | Zaluska et al. | |
| 6,471,935 B2 | 10/2002 | Jensen et al. | |
| 6,596,055 B2 | 7/2003 | Cooper et al. | |
| 6,680,042 B1 | 1/2004 | Schulz et al. | |
| 7,029,600 B2 * | 4/2006 | Ovshinsky et al. | .... 252/188.27 |
| 7,094,387 B2 * | 8/2006 | Zidan | ......... 423/644 |
| 2002/0166286 A1 | 11/2002 | McClaine et al. | |
| 2003/0053948 A1 | 3/2003 | Bogdanovic et al. | |

OTHER PUBLICATIONS

Sadanadan et al, "Synthesis and Thermoelectric Power of Nitrogen-Doped Carbon Nanotubes", J. of Nanosci Nanotech, pp. 99-103, 2003, vol. 3 No. 1/2, American Scientific Pub, US.

Bogdanovic & Schwickarki, "Ti-doped alkali metal aluminum hydrides as potential novel reversible hydrogen storage materials," J. Alloys & Compounds, 253-254 (1997) 1-9.

(Continued)

*Primary Examiner*—Wayne A. Langel
(74) *Attorney, Agent, or Firm*—J. Bennett Mullinax, LLC

(57) ABSTRACT

A hydrogen storage material having improved hydrogen absorbtion and desorption kinetics is provided by adding graphite to a complex hydride such as a metal-doped alanate, i.e., $NaAlH_4$. The incorporation of graphite into the complex hydride significantly enhances the rate of hydrogen absorbtion and desorption and lowers the desorption temperature needed to release stored hydrogen.

6 Claims, 8 Drawing Sheets

OTHER PUBLICATIONS

Bogdanovic et al, "Metal-doped sodium aluminum hydrides as potential new hydrogen storage materials," J. Alloys & Compounds, 302 (2000) 36-58.

Zidan et al, "Hydrogen cycling behavior of zirconium and titanium-zirconium-doped sodium aluminum hydride," J. Alloys & Compounds, 285 (1999) 119-122.

Jensen et al, "Advanced titanium doping of sodium aluminum hydrides: segue to a practical hydrogen storage material?" Intl. J. Hydrogen Energy 24 (1999) 461-465.

Bogdanovic et al, "Investigation of hydrogen discharging and recharging processes of Ti-doped NaAlH4 by X-ray diffracton analysis (XRD) and solid-state NMR spectroscopy," J. Alloys & Compounds, 350 (2003) 246-255.

Ruggeri, et al, "Influence of carbon on the electrode characteristics of MgNi prepared by mechanical alloying," J. Alloys & Compounds 343 (2002) 170-178.

Iwakura et al, "A new electrode material for nickel-metal hydride batteries: MgNi-graphite composites prepared by ball-milling," J. Alloys & Compounds 293-295 (1999) 653-657.

Bouaricha et al, "Activation characteristics of graphite modified hydrogen absorbing materials," J. Alloys & Compounds 325 (2001) 245-251.

Zalusa et al, "Sodium alanates for reversible hydrogen storage," J. Alloys & Compounds 298 (2000) 125-134.

Ritter et al, "Implementing a hydrogen economy," materialstoday, Sep. 2003, pp. 18-23.

* cited by examiner

HYDROGEN STORAGE MATERIAL AND PROCESS USING GRAPHITE ADDITIVE WITH METAL-DOPED COMPLEX HYDRIDES

RELATED APPLICATIONS

This application claims the benefit of U.S. Application Ser. No. 60/488,108 filed on Jul. 17, 2003, and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

This invention is directed to hydrogen storage materials having improved hydrogen absorption and desorption kinetics. In accordance with this invention, it has been found that the addition of graphite additives to a complex hydride such as a metal-doped alanate ($NaAlH_4$) significantly enhances the rate of hydrogen absorption/desorption and lowers the desorption temperature needed to bring about the release of stored hydrogen.

BACKGROUND OF THE INVENTION

Complex hydrides such as sodium aluminum hydrides (i.e., $NaAlH_4$), like many other alanates of alkaline metals, are promising materials for hydrogen storage because of their relatively large capacity for storage of useful hydrogen. For example, $NaAlH_4$ has a hydrogen storage capacity of 5.6 wt %. The main problem of these complex hydride materials, however, is their slow hydrogenation and dehydrogenation kinetics. In pure sodium alanates, dehydrogenation temperatures take place well above 200° C. despite the fact that the reactions as set forth below are thermodynamically favorable:

$$3NaAlH_4 \rightarrow Na_3AlH_6 + 2Al + 3H_2 \quad (1)$$

$$Na_3AlH_6 \rightarrow 3NaH + Al + 3/2H_2 \quad (2)$$

The strong catalyst behavior of Ti on $NaAlH_4$ was first noticed using solution chemistry techniques, whereby non-aqueous solutions of $NaAlH_4$ and either $TiCl_3$ or $Ti(OBu^n)_4$ catalyst precursors were decomposed to solid Ti-doped $NaAlH_4$. This work was referenced in the publication by B. Bodanovic, and M. Schwickardi, *J. Alloys Comp.* 253 (1997) 1, and which is incorporated herein by reference.

The existence of some synergistic interaction between Ti and other metal catalysts such as Fe and Ni when doped in alanates is also known. Such interactions have been reported in the publications of B. Bogdanovic, R. A. Brand, A. Marjanovic, M. Schwickardi, and J. Tölle, *J. Alloys Comp.* 302 (2000) 36; R. A. Zidan, S. Takara, A. G. Hee C. M. Jensen, *J Alloys Comp.* 285 (1999) 119; and, C. M. Jensen, R. Zidan, N. Mariels, A. Hee, C. Hagen, *Inter. J. Hydrogen Energy* 24 (1999) 461; the above publications being incorporated herein by reference.

The Zidan et al publication referenced above also sets forth that a further lowering of the dehydrogenation temperature depends largely on the doping and homogenization procedures and also noted the important catalytic role of Zr. Today, there is general agreement that one of the main dynamic mechanisms controlling the adsorption/absorption and desorption of $H_2$ is a diffusional one and thus the kinetic behavior of both processes depends largely on the characteristic particle size of the samples. Because of this, high intensity ball milling has become the most important if not the only procedure for preparing and doping alanates.

Another negative aspect of alanates is the strong deleterious effect that repeated cycles of hydrogen adsorption and desorption has on both kinetic performance and hydrogen capacity in these materials. The Bogdanovic et al. publication (*J. Alloy Compd*. 350 (2003) 246 and incorporated herein by reference) suggested that the latter resulted from an incomplete reaction between phases of $Na_3AlH_6$ and Al, which become isolated by regenerated $NaAlH_4$ that is formed. The data in Bogdanovic et al convincingly demonstrated that adding small but proper amounts of Al metal to the alanates prior to ball milling solves the problem.

The development of catalyzed alanates having better performance kinetics has not progressed and is largely attributable to the limited techniques, such as ball milling, which are available. This lack of advancement in the field suggests the necessity for different approaches. One such approach is the utilization of graphites as additives to alanates.

By mechanisms that are not yet fully understood, it has recently been discovered that graphitic structures, such as fullerenes, diverse graphites and even carbon nanotubes, play, under certain conditions, an important role in improving the kinetics of dehydrogenation and reversibility of certain complex metal hydrides. As defined herein a "complex metal hydride" refers to $AlH_3$-based hydrides such as $NaAlH_4$ which readily liberate hydrogen at moderate temperatures on the order of about 100° C. to about 150° C. and which yields a dehydrogenated form of hydride which cannot easily be regenerated with hydrogen gas or which requires extreme conditions in order to rehydrate. Accordingly, complex metal hydrides should not be confused with metal, intermetallics, or alloyed hydrides such as but not limited to $MgH_2$, $LaNi_5H_6$, or $FeTiH_{1.2}$ respectively.

A series of studies have shown that $Mg_2Ni$ experiences marked desorption and capacity improvements when mixed and milled together with graphitic carbon. See the publications of S. Ruggeri, L. Roué, G. Liang, et al., *J. Alloy Compd*. 343 (2002) 170; C. Iwakura, H. Inoue, S. G. Zhang, et al., *J. Alloy Compd*. 293-295 (1999) 653; and S. Bouaricha, J. P. Dodelet, D. Guay, et al., *J. Alloy Compd*. 325 (2001) 245, which publications are incorporated herein by reference. Zaluska et al. has investigated the role of carbon on alanates and demonstrated that carbon improves the dehydrogenation and hydrogenation kinetics of sodium analates as seen in the publication A. Zaluska, L. Zaluski, and J. O. Ström-Olsen, *J. Alloy Compd*. 298 (2000) 125 which is incorporated herein by reference. However, results of this work indicate that graphite does not improve the kinetics. In addition, no study has yet investigated the effects of carbon, including graphite, activated carbon, or even carbon nanotubes, upon samples of Ti-doped $NaAlH_4$ or other catalyst dopant.

U.S. Pat. No. 6,680,042, assigned to Hydro-Quebec, discusses the use of graphite along with various liquid hydrocarbons which are beneficial for overcoming an oxide coating on the surface of a hydrogen storage material. In the case of magnesium metal, the presence of graphite reduces the time required to prepare a hydride when the hydride is subjected to intense mechanical grinding under hydrogen pressure and at high temperatures. The reference does not report any improvements in desorption kinetics for materials prepared with graphite nor does the reference discuss the use of titanium doped NaAlH$_4$ materials.

Accordingly, there remains room for improvement and variation within the art.

SUMMARY OF THE INVENTION

It is one aspect of at least one of the present embodiments to provide for a sodium alanate having improved hydrogen storage kinetics by incorporating between about 5 to about 10 wt % graphite with a titanium-doped NaAlH$_4$.

It is yet a further aspect of at least one of the present embodiments to provide for a hydrogen storage material and process in which a graphite additive brings about a hydrogen desorption rate for a catalyst doped complex hydride approximately six times greater than the complex hydride having no graphite additive.

It is yet a further aspect at least one of the present embodiments to provide for a hydrogen storage alanate material and process in which a graphite additive improves the rehydrogenation of the alanate as evidenced by increased yield of formed NaAlH$_4$.

It is yet an additional aspect of at least one of the present embodiments of the invention to provide for a hydrogen storage material comprising a complex hydride of the AlH$_3$-based hydrides such as NaAlH$_4$ containing therein about 5 wt % aluminum, about 10 wt % graphite, and about 2 mole % titanium, said hydrogen storage material prepared by a ball-milling process.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Figure 1:
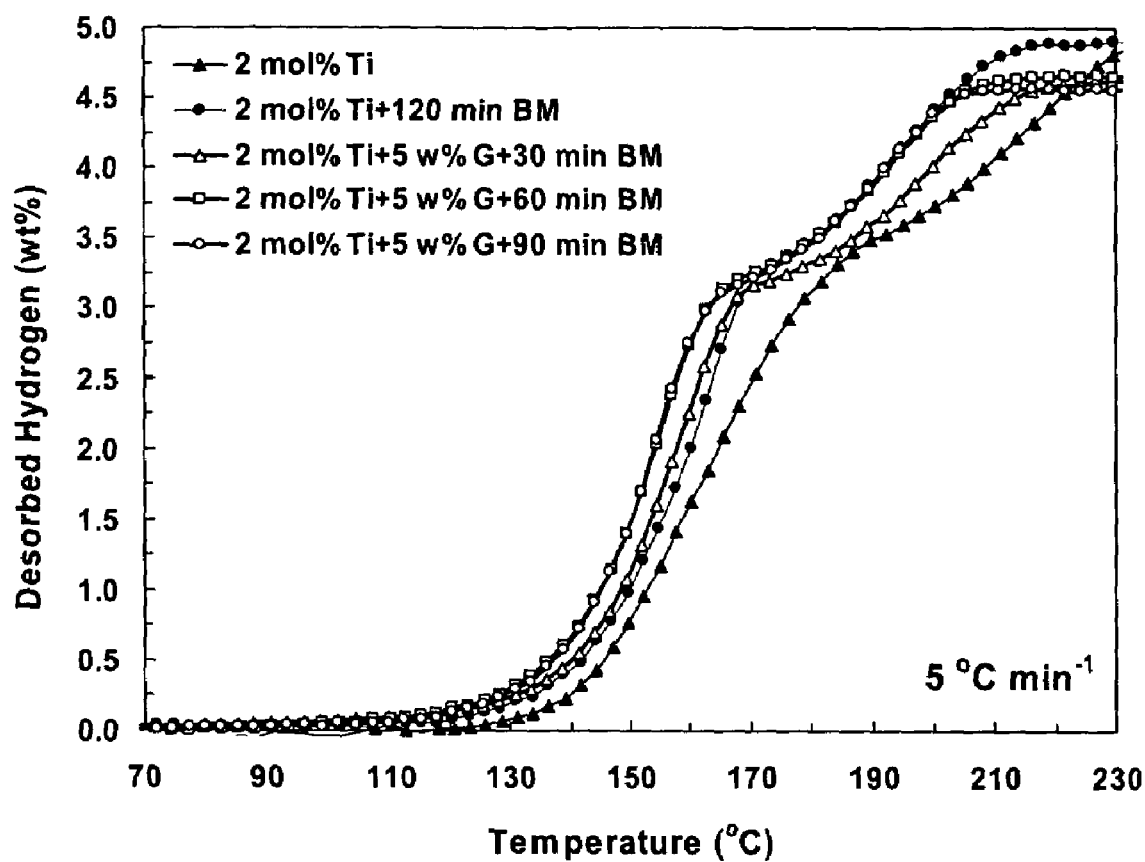
FIG. 1 sets forth thermally programmed desorption (TPD) runs of samples with 5 wt % graphite and without graphite at different ball-milling times with a ramping rate of 5° C./min. The samples utilized for the runs with graphite were prepared from samples that were ball milled without graphite for 120 minutes.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

TiCl$_3$ (Aldrich) was used as received as the catalyst precursor. Aluminum (Alfa Aesar, 99.97%) and SFG 75 graphite TIMREX™ additives were also used as received. Crystalline NaAlH$_4$ (Fluka) was purified from a THF (Aldrich, 99.9%, anhydrous) solution and vacuum dried. The dried NaAlH$_4$ was mixed with a predetermined amount of catalyst directly inside the mill vial then ball-milled for 2 hours using a high-energy SPEX 8000. After ball milling, a desired amount of graphite, from about 5 wt % to about 20 wt %, was added to the sample, then ball-milled for 1 hour. The effect of ball-milling time was evaluated using a range of ball-mill times from 10 to 90 minutes. NaAlH$_4$ samples containing 5 wt % Al, 10 wt % graphite, and a 2 mole % Ti-dopant were prepared by ball-milling the mixture for 1 hour. All of the above procedures were carried out in a N$_2$-laden glove box free of oxygen and moisture.

A Perkin-Elmer thermogravimetric analyzer (TGA), which follows the change of weight of samples in time, was used to determine the hydrogen desorption kinetics at atmospheric pressure in samples. This instrument was also located inside a glove box under nitrogen atmosphere to prevent any exposure of the samples to air and moisture. TPD runs were carried out on the samples up to 250° C. at a ramping rate of 2° C./min under 1 atm of He, using an initial 1 minute delay to ensure an environment of pure He. For the study investigating the effect of the ball-milling time, the ramping rate was 5° C./min. The isothermal analyses were performed through CTD runs, where samples were heated to a certain temperature under 1 atm of He and then kept at that temperature for a certain time. Approximately 10 mg of sample were used in the TGA.

The effect of cycling the samples through dehydrogenation and hydrogenation was also analyzed in a TGA. For this purpose, a leak proof, high-pressure reactor connected with a pressure transducer and thermocouple was devised. All dehydrogenation and hydrogenation runs of the samples were performed at 125° C. in ultra pure hydrogen. All samples were previously ball milled before inserting them in the reactor. Dehydrogenation of the samples was performed at around one atmosphere while regeneration or hydrogenation of the samples was performed at about 1500 psi, in each case for a period of about 2 hours.

Results and Discussion

Effects of Ball-mill Time and Amount of Graphite on Ti-doped NaAlH$_4$

FIG. 1 shows the TPD results of 5 wt % graphite (G) with 2 mole % Ti-doped NaAlH$_4$ for different ball-milling times and a ramping rate of 5° C. min$^{-1}$. As expected, the rate of H$_2$ desorption increases with increased ball-milling time, to a point where no further improvements were observed. Normally, this takes place within 60 minutes of milling. The line with solid circles is the best kinetics behavior that can be obtained for this sample with high intensity ball milling. In this case, the sample was milled for 120 minutes, 60 more than necessary, to ensure that a sample free of graphite had been prepared to obtain the best kinetic behavior. The effect of adding graphite is clearly observed in FIG. 1. With only an additional 60 minutes of ball-milling, samples of 2 mole % Ti-doped NaAlH$_4$ with 5 wt % graphite (line with empty squares) achieved most enhanced H$_2$ desorption kinetics exhibiting TPD results at least 10° C. lower than the best obtainable TPD run without this additive (line with filled circles). The difference that is observed between these two situations becomes more pronounced with slower ramping rates.

Figures 2A, 2B:
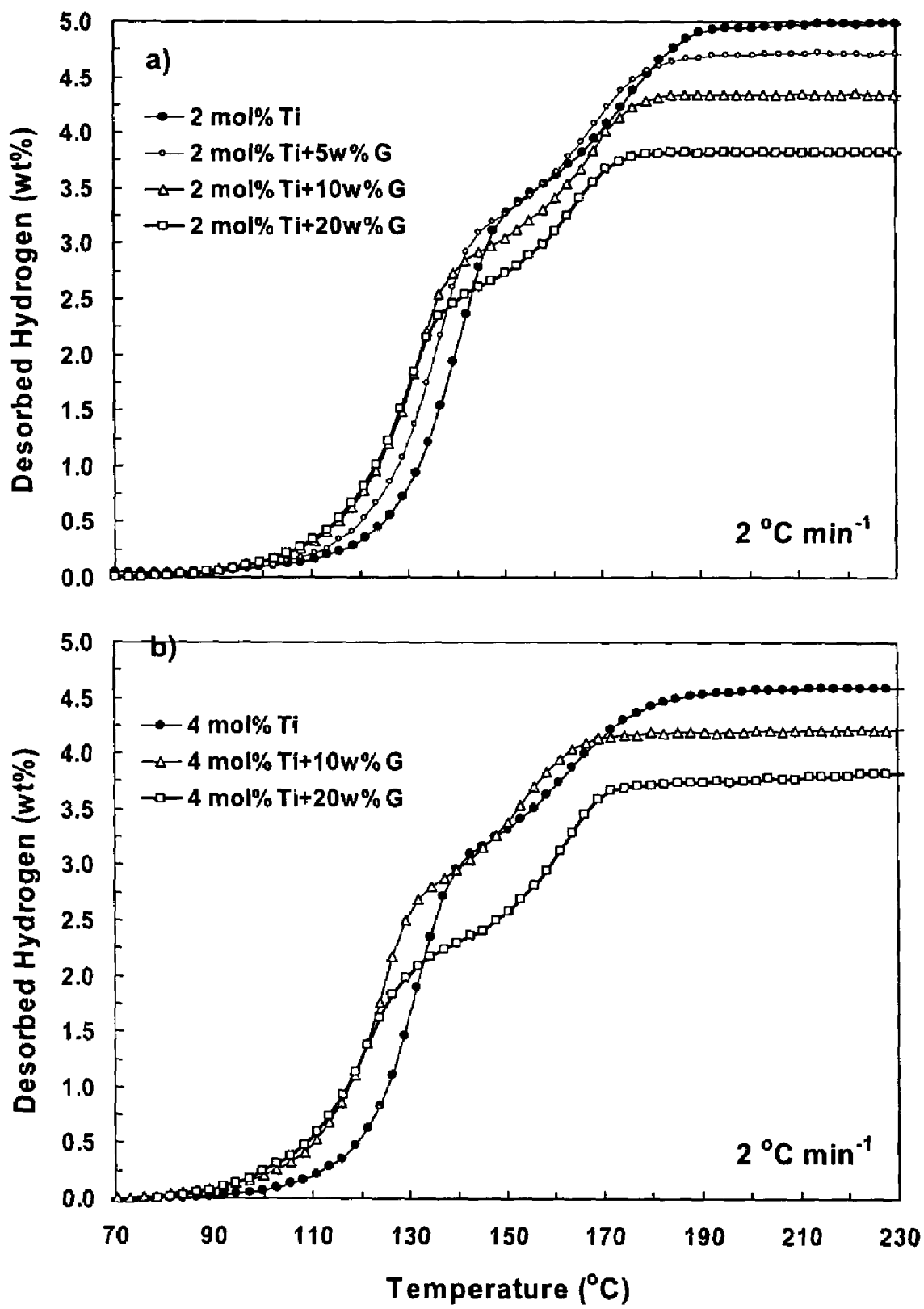
FIGS. 2A and 2B set forth TPD runs at a rate of 2° C./min in samples doped with a) 2 mole % of Ti and 0, 5, 10 and 20 wt % graphite (G); or b) 4 mole % of Ti and 0, 10 and 20 wt % graphite (G), FIGS. 3A and 3B set forth constant temperature desorption (CTD) runs at a) 90° C.; or b) 110° C. on samples doped with 2 mole % of Ti and 0, 5 and 10 wt % (G).

FIGS. 2A and 2B show the effect of the graphite content on the sodium alanates. In this case, TPD runs were carried out at 2° C. min$^{-1}$ on 2 mole % (FIG. 2a) and 4 mole % (FIG. 2b) Ti-doped NaAlH$_4$ with 10 wt % and 20 wt % graphite (G). The effect of increasing the amount of graphite on the desorption kinetics of the samples is clearly seen. However, no further improvement was observed in the kinetics of desorption with graphite contents larger than 10 wt %. Notice that for both situations the TPD curves for 10 wt % and 20 wt % overlap at the left hand side of the plots. This result is a strong indication that graphite is not directly interacting with the catalyst but possibly more directly with the alanate through a mechanism that is probably similar to that suggested elsewhere between graphite and metal hydrides. The decrease of total H$_2$ capacity that is observed with larger contents of graphite, and which is defined by the values of horizontal sections at the high temperature regions of the TPD curves, is simply due to the inability of graphite to adsorb hydrogen at the temperatures used in the experiment.

Figures 3A, 3B:
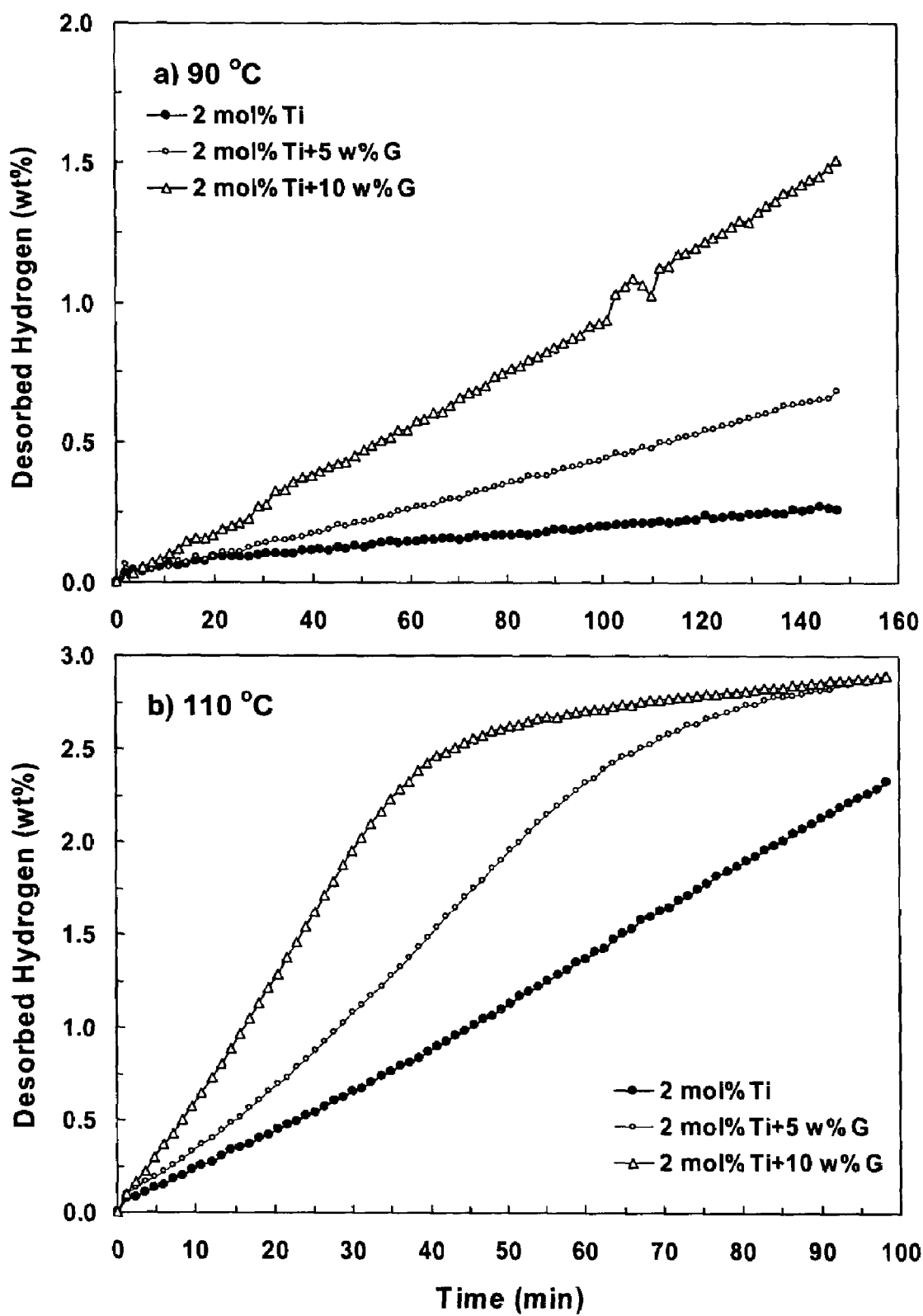

FIGS. 3A and 3B show the CTD results on samples 2 mole % Ti-doped NaAlH$_4$ with 0, 5 and 10 wt % graphite(G) at 90° C. (FIG. 3a) and 110° C. (FIG. 3b), respectively. Clearly, the H$_2$ desorption rate of samples with graphite is much better than that without graphite. Generally, the 10 wt % graphite(G) with 2 mole % Ti-doped NaAlH$_4$ sample shows the best behavior in terms of desorption rate of H$_2$. At 90° C., the H$_2$ desorption rate increased six times when doping the samples with 10 wt % graphite over samples without graphite. Similar results can be seen at 110° C., but the effect of graphite is little less significant. It is important to note, however, that under these conditions the hydrogen that is released corresponds largely to that resulting from the first dehydrogenation reaction (i.e., Eq. 1). At 110° C. most of the H$_2$ in samples containing 10 wt % graphite is desorbed in less than 40 minutes.

Figure 4:
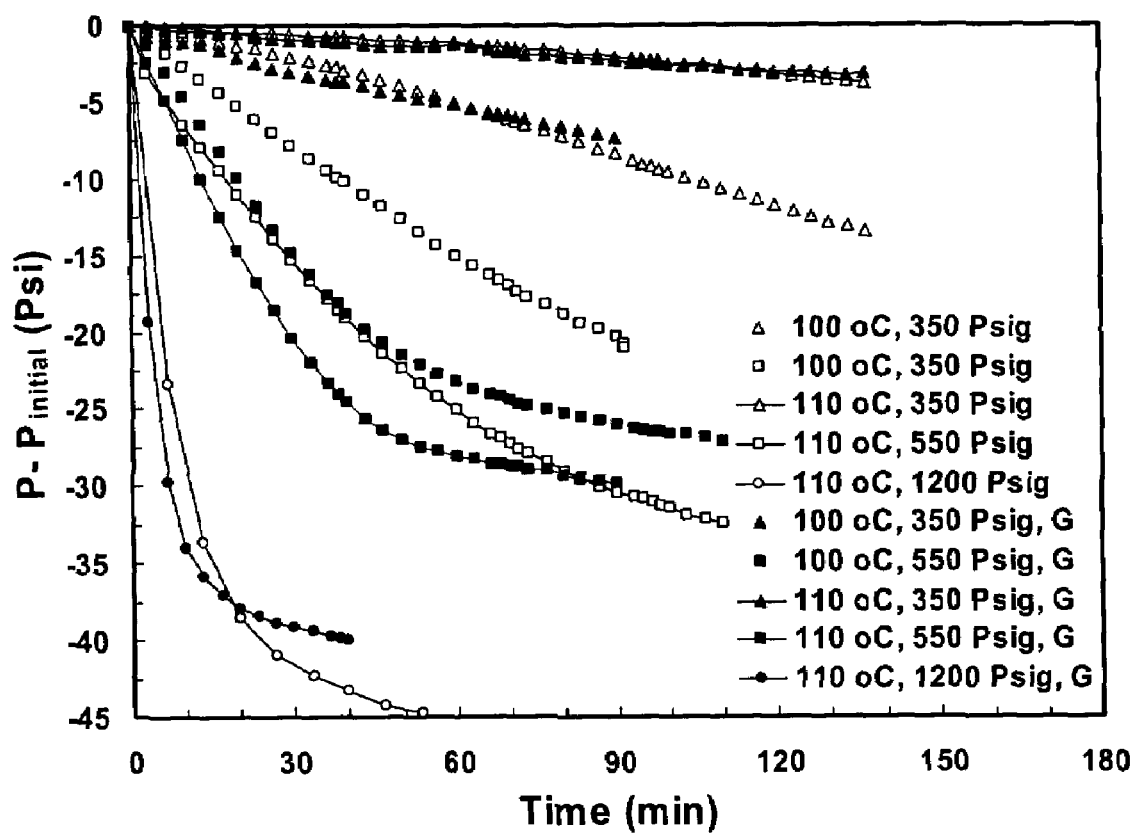
FIG. 4 sets forth hydrogen absorption cycle data at 110° C.

FIG. 4 provides an additional indication that the speed of uptake of hydrogen is dependent upon the initial pressure. The presence of hydrogen increases the speed of H$_2$ uptake compared to samples without graphite.

Figure 5:
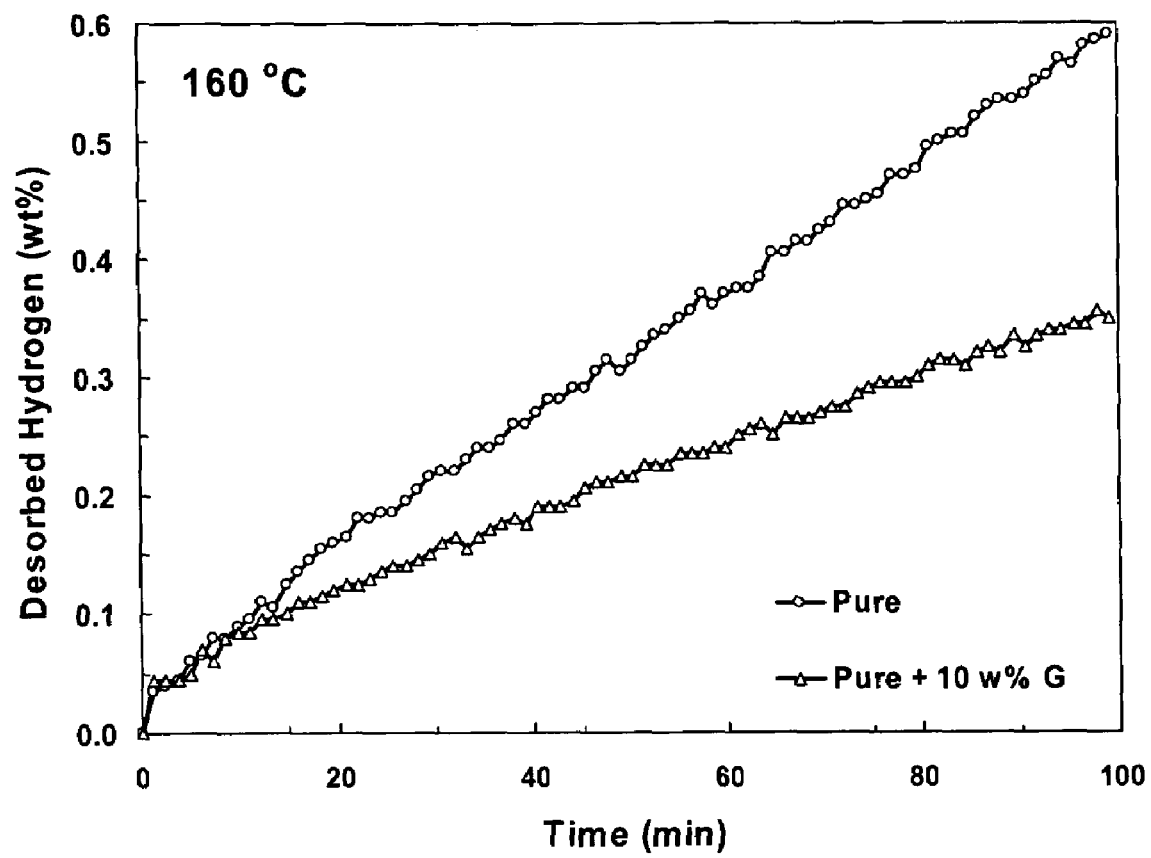
FIG. 5 sets forth CTD runs at 160° C. on a pure sample of Na alanate and on a pure sample of Na alanate with 10 wt % graphite.

In FIG. 5, Ti free samples, without a dopant (Ti), perform less well when graphite is present.

Cycle Tests

Figures 6A, 6B:
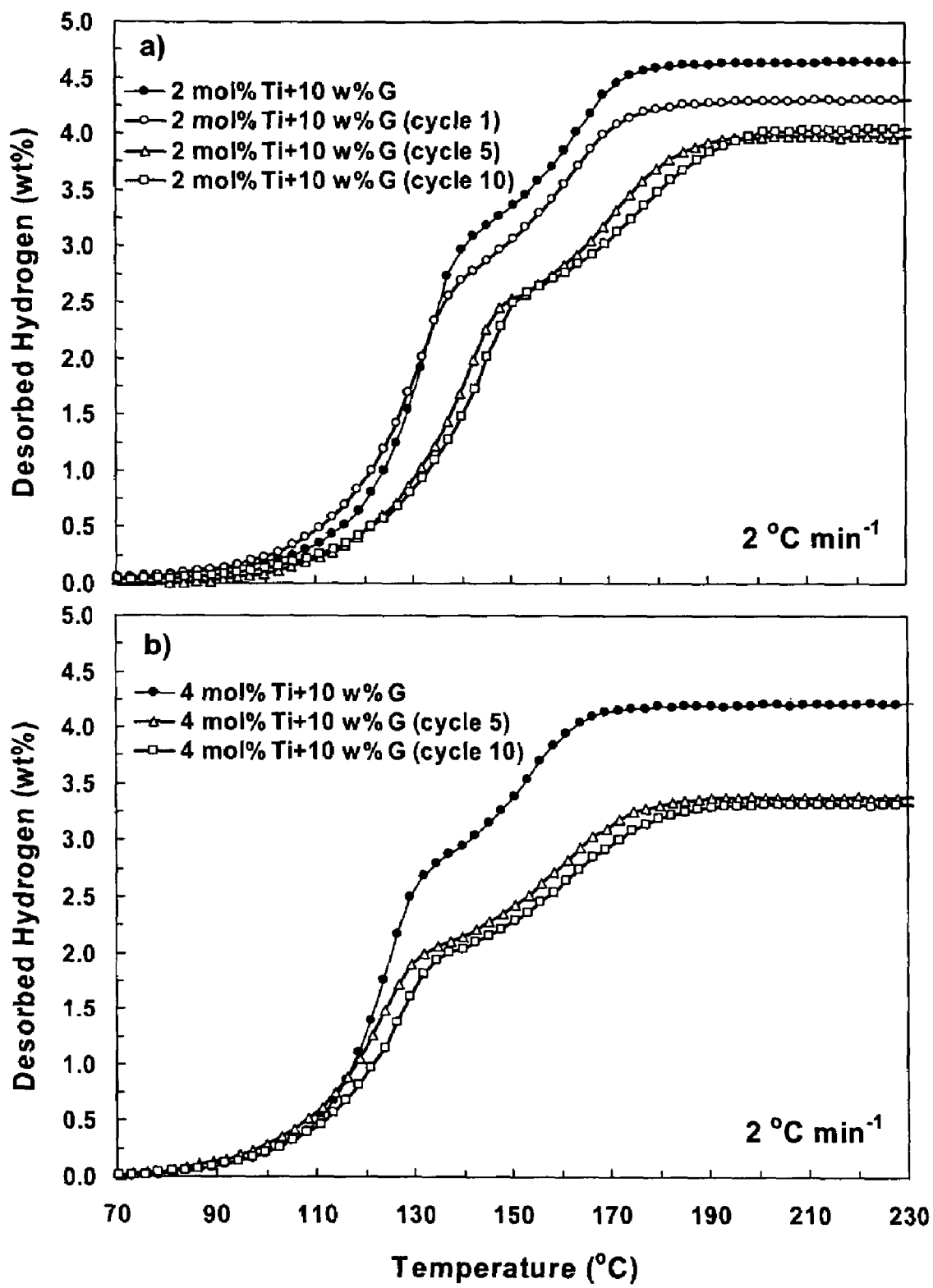
FIGS. 6A and 6B set forth TPD runs at a rate of 2° C./min on samples doped with a) 2 mole % of Ti and 10 wt % graphite after 0, 1, 5 and 10 desorption/regeneration cycles; or b) 4 mole % of Ti and 10 wt % graphite after 0, 5 and 10 desorption/regeneration cycles.

FIGS. 6A and 6B show the TPD results depicting the effect of hydrogenation and dehydrogenation cycling on samples of 2 mole % (FIG. 6a) and 4 mole % (FIG. 6b) Ti-doped NaAlH$_4$. Clearly, in both situations TPD runs on samples exhibit no further changes after the fifth cycle. The effect that hydrogen cycling produces on both the dehydrogenation kinetics and the total hydrogen capacity during the first five cycles is noticeable. The samples with larger concentrations of Ti (i.e., 4 mole % in FIG. 6b) experienced only a minimal change in the dehydrogenation kinetics. The change in kinetics is apparent from the overlapping TPD curves at the lower temperature region. The data reflects the important role of Ti in the mechanism suggested by Bogdanovic et al. in the publication B. Bogdanovic, M. Felderhoff, M. Hartel, et al., J. Alloy Compd. 350 (2003) 246 and which is incorporated herein by reference.

Figure 7:
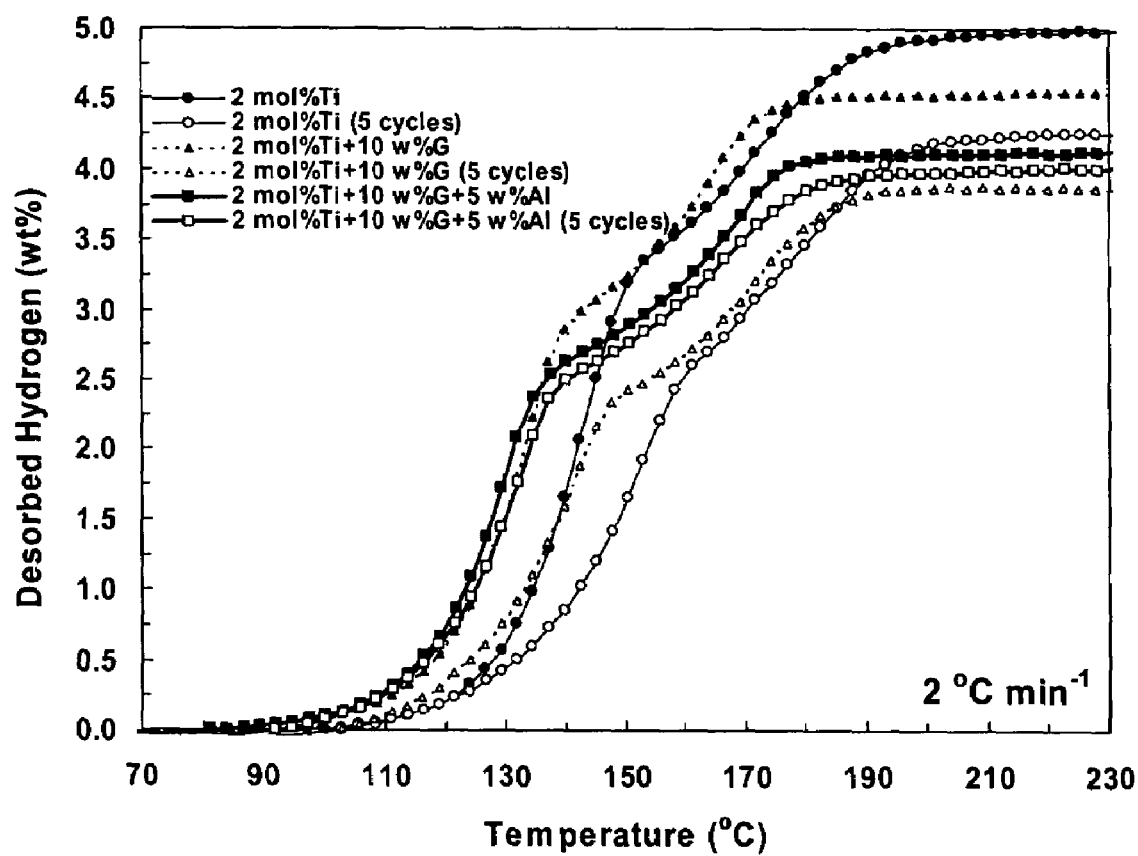
FIG. 7 sets forth TPD runs at a rate of 2° C./min comparing three samples, one of which contains no additive, the second only 10 wt % graphite as an additive and the third 10 wt % graphite with 5 wt % Al after 0 and 5 cycles.

FIG. 7 shows TPD curves indicating the effect of 10 wt % graphite on 2 mole % Ti-doped NaAlH$_4$ samples prior to (empty symbols) and after the fifth cycle (solid symbols). The Figure also shows the additional effect of 5 wt % aluminum in combination with the 10 wt % graphite. The better performance of the samples containing graphite (triangles) over the samples without any additive (circles) is clearly seen following five cycles. After five cycles, the samples experience no further changes due to H$_2$ cycling. More significant is the concomitant role of aluminum and graphite on the samples (squares). For instance, the addition of aluminum maintains the dehydrogenation kinetics (at low temperature regions) to a value identical to that of the sample containing graphite prior to cycling. As seen, the addition of aluminum provides exemplary TPD characteristics. In addition, despite the dilution effect attributable to the addition of aluminum (as indicated by the lowest total hydrogen capacity between the TPD curves prior to cycling of all three samples), the addition of aluminum protected the sample from capacity loss. For example, samples without aluminum experienced losses of at least 0.6 wt % in H$_2$ capacity after the fifth cycle. In the sample containing aluminum, the loss of hydrogen capacity was only about 0.1 wt %. It is noteworthy that the role of aluminum is so important that after the fifth cycle the total hydrogen capacity of the sample containing this metal and graphite was even better than that of the sample containing graphite alone.

Figure 8:
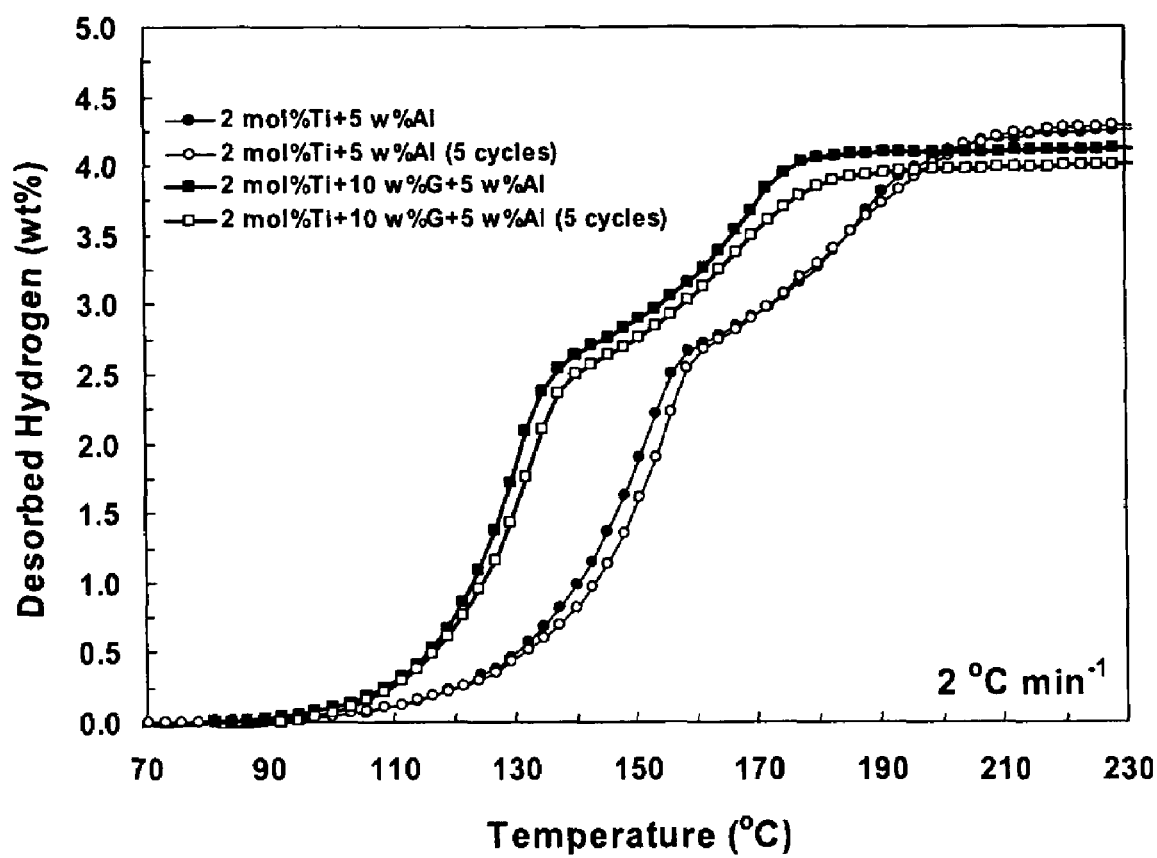
FIG. 8 sets forth TPD runs at a rate of 2° C./min comparing a sample containing only 5 wt % Al with one containing 10 wt % graphite in addition to 5 wt % Al after 0 and 5 cycles.

It must be stressed, however, that the remarkable results obtained with aluminum are not due to this metal alone but results from the synergistic effect of graphite. FIG. 8 illustrates the results of adding 10 wt % graphite to samples containing 2 mole % Ti and 5 wt % Al. The results clearly show that aluminum plays only a protective role on the samples while graphite is the key participant responsible for the significant enhancements seen in the kinetics of dehydration in alanates.

These results prove the enhancing effect that adding graphite on Ti-doped NaAlH$_4$ have on the dehydrogenation kinetics of alanates. By adding graphite, it was observed in TPD runs that the initial H$_2$ desorption temperature decreases by at least 10° C. when compared to values of Ti-doped NaAlH$_4$ without graphite. Benefits were observed in constant temperature runs, where H$_2$ desorption kinetics in samples containing graphite clearly improved, giving rates closer to appropriate values for fuel cell operating conditions which are around 80° C. Cycle testing on these samples shows very significant losses of total H$_2$ capacity and kinetics of desorption during the first five cycles; during further steps changes to these two properties are hardly noticeable. The addition of aluminum significantly protects the samples from the changes just described, but it has been demonstrated that aluminum has no role in enhancing the kinetic of dehydration of the samples. As set forth herein, the present data establishes that samples containing both Al and graphite operate at kinetic release rates and temperatures close to the ranges and conditions required by PEM fuel cells. The collaborative effect observed in samples containing aluminum and graphite show that complex hydrides such as the alanates presently used have improved hydrogen storage properties.

Results show that graphite significantly enhances the rate of H$_2$ desorption on the alanate samples. TPD and CTD runs on alanates containing graphite consistently showed lower desorption temperatures and faster desorption kinetics over samples without this additive. Results also indicate that the amount of graphite providing optimum desorption kinetics (about 10 wt %) is independent of the amount of Ti present. The use of graphite alone does not stop the deleterious effect that hydrogen cycling via regeneration and desorption has on the kinetic of adsorption and hydrogen capacity of the samples. This problem may be avoided, however, by adding aluminum metal to the sample mixture prior to milling. Further, results show that the concomitant use of graphite and aluminum results in a material with the best kinetic behavior so far seen in sodium alanates.

In other complex, hydride materials such as boron hydrides, when reversible, graphite is expected to have the same effects as seen for the sodium alanates. As such a reversible hydrogen storage material may be provided comprising a boron hydride; a catalytically effective amount of a dopant; an effective amount of a boron additive sufficient to protect the dehydration kinetics of the boron hydride from cycle degradation; and, an effective amount of graphite sufficient to enhance the rate of hydrogen desorption of the boron hydride; wherein the boron hydride, the effective amount of boron, the effective amount of graphite, and the dopant are co-processed through a ball-mill apparatus thereby providing a reversible hydrogen storage composition.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A reversible hydrogen storage composition comprising:
    an AlH$_3$-based complex hydride;
    a catalytically effective amount of a titanium dopant;
    an effective amount of an aluminum additive sufficient to protect the dehydration kinetics of the complex hydride from cycle degradation; and,
    an effective amount of graphite sufficient to enhance the rate of hydrogen desorption of the complex hydride;
    wherein said AlH$_3$-based complex hydride, said effective amount of aluminum additive, said effective amount of graphite, and said titanium dopant are co-processed through a ball-mill apparatus thereby providing a reversible hydrogen storage composition.

2. The hydrogen storage composition according to claim 1 wherein said effective amount of an aluminum additive is about 5 wt % of said hydrogen storage material.

3. The hydrogen storage composition according to claim 1 wherein the effective amount of graphite is about 10 wt % of said hydrogen storage material.

4. The hydrogen storage composition according to claim 1 wherein said catalytically effective amount of said titanium dopant is about 2 mole % titanium.

5. A reversible hydrogen storage material comprising:
    the complex sodium aluminum hydride;
    a titanium catalyst present in an amount of about 2 mole %;
    a graphite additive present in an amount of between about 5 wt % to about 10 wt %;
    an aluminum additive present in an amount of about 5 wt %;
    wherein said sodium aluminum hydride, said titanium catalyst, said graphite and said aluminum additive are subjected to a ball-milling process, thereby forming a hydrogen storage material.

6. The hydrogen storage material according to claim 5 wherein said hydrogen storage material has a hydrogen desorption rate approximately six times greater than the corresponding hydrogen storage material having no graphite additive.

* * * * *